Aug. 25, 1953   C. E. TACK   2,649,935
MAGNETIC RAILWAY BRAKE
Filed Sept. 23, 1948   2 Sheets-Sheet 2
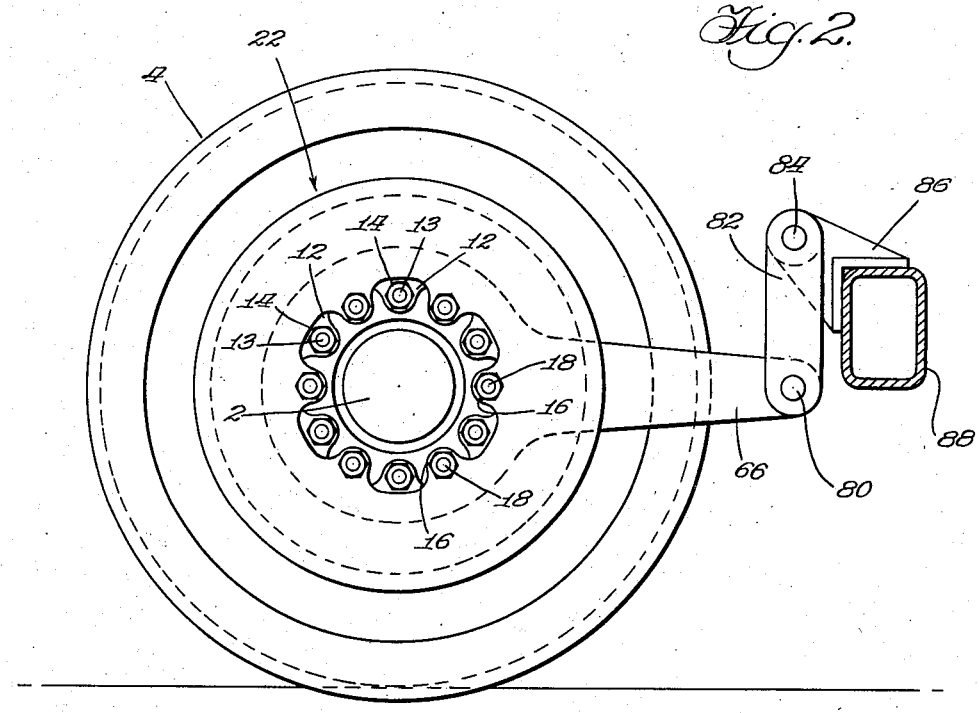
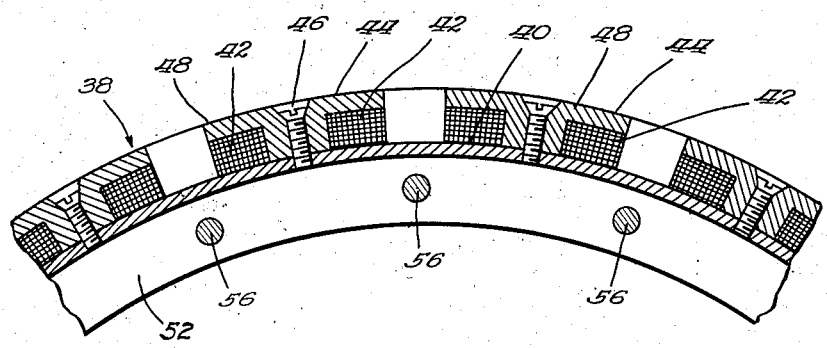
INVENTOR.
Carl E. Tack Patented Aug. 25, 1953

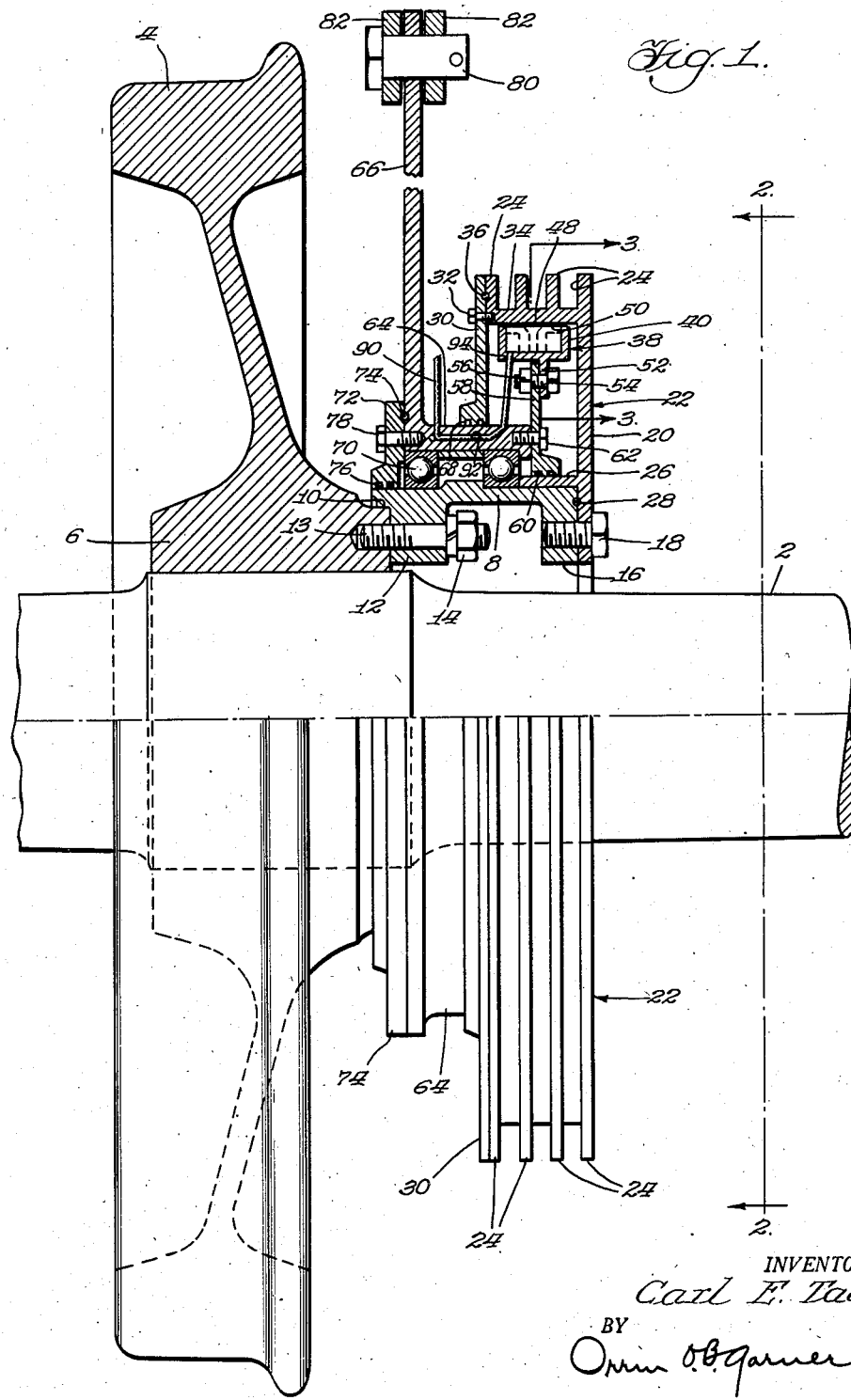

2,649,935

UNITED STATES PATENT OFFICE 2,649,935

MAGNETIC RAILWAY BRAKE

Carl E. Tack, Chicago, Ill., assignor to American Steel Foundries, Chicago, Ill., a corporation of New Jersey Application September 23, 1948, Serial No. 50,779

6 Claims. (Cl. 188—33)

This invention relates to railway brakes and more particularly to a novel magnetic brake wherein a magnetic field is established through a slurry of magnetic particles and lubricant to solidify the slurry which in its solidified state affords frictional connection between the rotor and stator means of the brake.

A general object of the invention is to devise a brake, such as above described, which is compact and capable of rapid assembly and disassembly with respect to a conventional railway wheel and axle.

Another object of the invention is to devise a magnetic brake of compact and sturdy construction capable of withstanding the torque stresses encountered in railway service.

A further object of the invention is to afford a simple and economical connection between the electromagnet of the brake and a conventional voltage supply.

A more specific object of the invention is to devise a magnetic brake wherein the slurry is thrown outwardly by the centrifugal force developed by rotation of the brake rotor to maintain the slurry in contact with the rotor and stator braking surfaces.

The foregoing and other objects and advantages of the invention will become apparent from a consideration of the following specification and the accompanying drawings, wherein:

Figure 1 is a fragmentary top plan view partly in central horizontal section of a railway wheel and axle assembly embodying the invention;

Figure 2 is a sectional view taken in the vertical plane indicated by the line 2—2 of Figure 1 illustrating the wheel and axle assembly shown therein, and fragmentarily illustrating the truck frame and its torque connection to the brake stator; and Figure 3 is a fragmentary sectional view taken on the line 3—3 of Figure 1.

Describing the invention in detail, the brake is illustrated as applied to a conventional railway wheel and axle assembly including an axle 2 and a wheel 4 having a hub 6 press-fitted on the axle which is adapted for reception within associated journal means (not shown).

The brake comprises an annular hub 8 fitted as at 10 on the wheel hub 6 and having a plurality of bosses 12 adapted for connection to the wheel hub 6 as by stud bolts or screws 13 and nuts 14. The inboard end of the hub 8 is provided with a plurality of bosses 16 connected as by screws 18 to an annular radial web 20 defining the inboard side of a rotor casing or housing 22 which is formed on its radially outer perimeter with a plurality of annular cooling fins 24. The web 20 is provided with an annular flange 26 fitted on the hub 8 and is provided with sealing means 28 providing a fluid-tight connection between the web 20 and the hub 8. The bosses 12 and 16, as best seen in Figure 2, are alternately arranged about the axle 2 to accommodate ready access to the screws 18 and nuts 14 from the inboard side of the casing 22.

The outboard side of the casing 22 is closed by an annular plate 30 connected as by screws 32 to an annular web 34 extending axially from the outboard side of the web 20 and formed with the above-mentioned fins 24. Sealing means 36 are provided to afford a fluid-tight connection between the outboard fin 24 and the plate 30.

The casing 22 contains a stator, generally designated 38, comprising a ring 40, generally U-shaped in radial cross section, as seen in Figure 1. The ring 40 contains a plurality of electromagnet coils 42 arranged in pairs, each pair being clamped to the ring 40 by a friction part or member 44 secured to the ring by a screw 46. It may be noted that the radial outer surface 48 of the members 44 constitutes the stator surface of the brake and the radially inner surface 50 of the web 34 constitutes the rotor surface of the brake, as hereinafter described in connection with the operation thereof.

The radially inner perimeter of the ring 40 is provided with an annular flange 52 having a plurality of openings 54 adapted for connection by bolt and nut assemblies 56 to an annular disc 58 having packing means 60 on its radially inner perimeter to afford a substantially fluid-tight connection to the flange 26 of the plate 20. The disc 58 is connected as by screws 62 to an annular web 64 of a torque arm 66, the web 64 extending into the casing 22 and being afforded a fluid-tight connection to the plate 30 by packing means 68 at the inner perimeter thereof. Conventional ball bearings 70 are provided between the web 64 and the hub 8 to afford a rotatable connection therebetween, the outboard side of the torque arm 66 being provided with a cover plate 72 having a fluid-tight connection to the arm 66 by packing means 74 and having a fluid-tight connection to the hub 8 by means of packing means 76. The plate 72 is connected to the arm 66 as by screws 78.

The torque arm is pivotally connected at 80 to a pair of links 82 having pivotal connections at 84 (Figure 2) to a bracket 86 mounted in any convenient manner to the transom 88 of a conventional railway car passenger truck which is not shown in detail inasmuch as the construction of such trucks is well known to those skilled in the art.

Electrical current is supplied to the coils 42 by means of one or more insulated leads 90, each of which extends through a passage 92 (Figure 1) in the web 64 of the torque arm 66 and extends from the passage 92 into the casing 22 and through the passage 94 in the ring 40 for connection to one of the coils 42. Preferably the coils 42 are connected in series and are connected to a conventional voltage supply (not shown) by two leads 90 which are connected to opposite terminals of the voltage supply, one of the leads being connected to the coil at one end of the series and the other lead being connected to the coil at the other end of the series. It will be understood, however, that, if desired, the coils may be connected in parallel to the voltage supply by a pair of leads 90 connected to opposite ends of each coil or, if desired, one terminal of the voltage supply may be connected to ground and one end of each coil 42 or one end of the series may be grounded through the torque arm, the opposite end of each coil or the opposite end of the series being connected by lead 90 to the other terminal of the voltage supply.

The casing 22 is preferably partly filled with a magnetic slurry comprising magnetic powders suspended in lubricant, as, for example, finely powdered iron in its elemental state or in magnetic compounds thereof within a lubricating oil of any desired viscosity. The slurry is thrown radially outwardly during rotation of the wheel and axle assembly 2, 4 in service so that the slurry preferably covers the surfaces 48 and 50 and any desired portion of the ring inwardly radially of the surfaces provided that the slurry preferably does not contact the lead 90, thereby avoiding any frictional drag or braking torque thereon during energization of the coils 42.

Thus it will be understood that upon energization of the coils 42, the slurry between the stator and rotor surfaces 48 and 50 respectively solidifies, as the result of a magnetic field therethrough due to energization of coils 42; and the magnetic particles of the slurry cohere to form chains connecting surfaces 48 and 50 to develop strong frictional resistance to relative rotation therebetween. The torque forces thus transmitted to the stator 38 are in turn transmitted by the torque arm 66 to the transom 88 of the truck frame.

I claim:

1. A magnetic brake arrangement for a railway wheel and axle assembly having an axle and a wheel thereon; comprising a hub having a plurality of radially inwardly extending bosses removably connected to the wheel, a plurality of radially inwardly extending bosses on said hub alternately arranged with the first-mentioned bosses, a casing, means for removably connecting the casing to the second-mentioned bosses, a cover plate removably secured to the outboard side of the casing, a torque arm having stator support means extending into the casing, a brake stator ring supported by said support means, electro-magnets housed within said ring, securing means for said magnets comprising shoes connected to the ring and clamped against the magnets, and a volume of slurry in said casing comprising magnetic particles suspended in liquid, said slurry contacting said shoes and an adjacent surface of said casing during rotation of the latter, said magnets when energized establishing a magnetic field through said shoes and casing surface.

2. In a brake arrangement for a vehicle having a wheel and axle assembly; the combination of a rotor housing having at least one internal rotor surface, a brake stator having a torque connection with the vehicle and having at least one stator surface in the housing spaced radially outwardly from its rotational axis, a body of fluid in the housing containing magnetizable particles and filling a portion only of the housing, sealing means between the stator and housing for preventing leakage of said fluid from said housing, whereby upon rotation thereof said fluid is urged radially outwardly to contact said surfaces and to define space radially inwardly of said surfaces and radially outwardly of said sealing means, electromagnetic means carried by the stator within the housing for developing a magnetic field across said surfaces, and at least one electrical lead extending radially outwardly of said sealing means through said space and connected to said electromagnetic means for establishing an electrical circuit therethrough.

3. In a brake arrangement for a vehicle having a wheel and axle assembly; the combination of a rotor housing part operatively connected to the assembly for rotation therewith, a torque member connected to the vehicle and having a stator part within the housing part, a body of fluid containing magnetizable particles, said fluid partly filling said housing whereby upon rotation thereof the fluid is urged radially outwardly by centrifugal force into contact with said parts along surfaces thereof spaced radially outwardly from the rotational axis of the housing part, sealing means preventing leakage of said fluid from said housing, said fluid during said rotation of the housing part defining the radially outer extremity of a space around said axis, said space extending between said sealing means and said surfaces, electromagnetic means carried by one of the parts for establishing a magnetic field across said surfaces, and at least one electrical lead connected to the electromagnetic means and extending radially outwardly of said sealing means through said space and entirely spaced from said fluid during said rotation of said housing part.

4. In a magnetic brake arrangement for a railway wheel and axle assembly having an axle and a wheel thereon; the combination of a hub having a plurality of radially inwardly extending bosses removably connected to the wheel, a plurality of radially inwardly extending bosses on said hub alternately arranged with the first mentioned bosses, a casing, means for removably connecting the casing to the second mentioned bosses, a torque arm having a stator support extending into the casing, a brake stator carried by said support within said casing, a volume of slurry in said casing comprising magnetic particles suspended in liquid, said slurry contacting surfaces of said stator and casing during rotation of the latter, and electromagnetic means carried by said support in said casing for establishing a magnetic field through said surfaces and slurry when said electromagnetic means are energized.

5. In a magnetic brake arrangement for a railway wheel and axle assembly having an axle and a wheel thereon; the combination of a hub structure having a plurality of radially inwardly extending bosses, readily removable means for connecting said bosses to said assembly, a plurality of radially inwardly extending bosses on said hub structure alternately arranged with the first mentioned bosses, a casing, readily removable means for attaching said casing to the second mentioned bosses, a brake stator in said casing, a volume of slurry in said casing comprising magnetic particles suspended in liquid, said slurry contacting surfaces of said stator and casing during rotation of the casing, and electromagnetic means for establishing a magnetic field through said surfaces and slurry when said electromagnetic means are energized.

6. In a brake arrangement for a railway car truck having a wheel and axle assembly; the combination of a hub structure having a plurality of radially inwardly extending bosses, readily removable means connecting said bosses to said assembly, a plurality of radially inwardly extending bosses on said hub alternately arranged with the first mentioned bosses, a casing, readily removable means for attaching the casing to the second mentioned bosses, and brake means carried by the truck and extending into the casing for cooperation therewith to decelerate rotation of said assembly upon actuation of said brake means.

CARL E. TACK.

References Cited in the file of this patent

UNITED STATES PATENTS

| Number | Name | Date |
| --- | --- | --- |
| 2,052,200 | Logan | Aug. 25, 1936 |
| 2,052,846 | Ryba | Sept. 1, 1936 |
| 2,382,552 | Eksergian et al. | Aug. 14, 1945 |
| 2,438,482 | Tack | Mar. 23, 1948 |
| 2,519,449 | Findley | Aug. 22, 1950 |
| 2,525,571 | Winther | Oct. 10, 1950 |
| 2,575,360 | Rabinow | Nov. 20, 1951 |

OTHER REFERENCES

National Bureau of Standards Technical Report 1213.